Patented Apr. 21, 1953

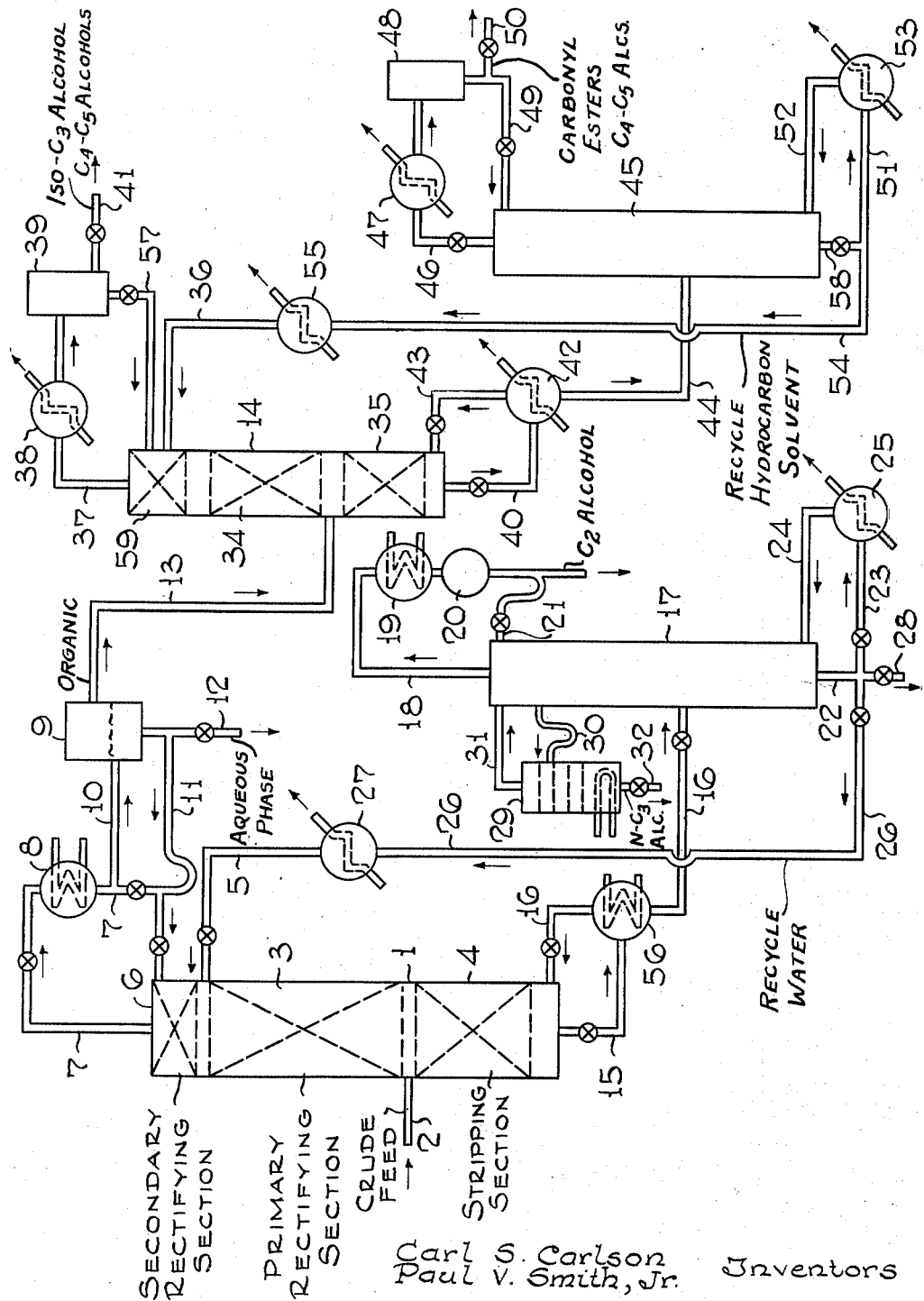

2,635,992

UNITED STATES PATENT OFFICE 2,635,992

SEPARATION AND PURIFICATION OF ALCOHOLS BY EXTRACTIVE DISTILLATION

Carl S. Carlson, Elizabeth, and Paul V. Smith, Jr., Westfield, N. J., assignors to Standard Oil Development Company, a corporation of Delaware Application March 1, 1949, Serial No. 79,018

3 Claims. (Cl. 202—39.5)

This invention relates to a method of separating pure alcohol products from crude aqueous mixtures of the alcohols contaminated by other types of oxygenated organic compounds.

Even in very close-cut fractions from aqueous products of hydrocarbon synthesis, carbonyl hydrogenation, hydrocarbon oxidation, or hydration processes, it is difficult to avoid having two or more alcohols present with various other types of close-boiling organic compounds, such as ketones, aldehydes, acetals, esters, ethers and hydrocarbons. One or more of the alcohol components can be separated from such crude mixtures in a fractional distillation column by employing a sufficiently large quantity of water as a refluxing medium throughout the fractional distillation zone in the column. This type of operation is suitable for isolating an alcohol which is a major component of the crude mixture, the thus isolated alcohol being retained in the dilute aqueous bottoms of the fractionating column; however it has been found desirable to improve on this operation in order to obtain a further satisfactory isolation of components from the overhead distillate of the fractionating column.

In accordance with the present invention when an alcohol is separated from the described types of crude mixtures by the modified fractional distillation using a controlled high water concentration in the internal reflux, an overhead distillate product from this fractional distillation is subjected subsequently to a second fractional distillation wherein the internal reflux employed has a controlled high concentration of a non-polar organic liquid such as a hydrocarbon oil for effectively isolating another alcohol as an overhead product from the second fractionation zone.

In carrying out the first fractional distillation, the initial crude alcohol mixture is continuously fed to a fractional distillation zone wherein vapors of the feed mixture pass countercurrently to an internal aqueous liquid reflux containing above 65 mol percent water and preferably 90–99 mol percent water. Generally, this water is supplied mainly at the top of the rectification zone of the column. By having a sufficient water concentration in the internal reflux, the volatilities of the neutral organic contaminants, and of one or more of the alcohol components, are increased relative to the volatility of one of the alcohol components to be isolated. The aqueous vapor mixture of the contaminants and of alcohol rendered more volatile is removed overhead from the distillation column. The residual portion of the liquid reflux which reaches the base of the column is a dilute aqueous solution of the isolated alcohol.

The concentration of water employed in the aqueous internal reflux depends upon the alcohol components being separated from the mixture but in any event is above 65 mol percent. For example, when ethanol and isopropanol are the alcohol components of the total mixture being separated any concentration of water from 65 mol per cent to 99 mol percent is highly effective. However, when ethanol and normal propanol are the alcohol components of the total mixture concentration of water between 90 and 99 mol percent preferably about 95 mol percent must be employed. The desired water concentration for any particular separation may be determined from the relative volatilities set forth in Table I below.

It is advantageous to remove as much of the water as possible from the first column distillate and to return the thus removed water to the upper part of the first column as a reflux. The high water content of this reflux supplements the water feed to the upper part of this first column. In some instances, it is possible to obtain a two-liquid phase separation of the distillate when a sufficient quantity of distillate components have a low water-solubility in the cooled distillate.

In order to maintain a homogeneous liquid on the plates of the second column it is preferred to keep the water content of the feed thereto below about 17 to 20 weight percent. If the first column distillate therefore is too highly aqueous it is recommended that it be concentrated to a water content of the above figure. The distillate from the first extractive distillation zone, or the organic phase of said distillate in the event of phase separation, is then passed into the second fractionating column wherein the required high concentration of a non-polar solvent is maintained in the internal reflux so that in the second fractionating column the desired separation of another alcohol from the neutral organic contaminants is accomplished. The non-polar refluxing medium used in the second fractionating column is maintained at a high volume concentration level, e. g., 70 volume percent to 99 volume percent, preferably about 80–90 volume percent, in order to assure the desired separation of the non-alcohol contaminants in a practical size fractionating column.

A variety of mechanical arrangements may be used for conducting the process and a suitable simplified arrangement is shown diagrammatically in the accompanying drawing.

In the drawing 1 represents the first fractionating column which receives a continuous feed stream of crude alcohol mixtures from inlet line 2 intermediate a rectifying section 3 and a lower stripping section 4, each of these sections being provided with means for obtaining efficient countercurrent liquid-phase contacting, e. g., such conventional means as bubble plates or packing. A feed stream of a large portion of the water which is to make up the internal refluxing medium that flows down through column 1 enters column 1 from line 5 at the upper part of the rectifying section 3.

A secondary rectifying section 6 is provided in column 1 above the primary rectifying section 3 to afford further fractionation which tends to make the vapors passing upwardly therethrough approach compositions containing azeotropic proportions of water with the volatilized organic components.

The final rectified vapors are withdrawn overhead from column 1 through line 7 by which they are passed through a cooling condenser 8 and line 10 to a liquid receiver 9, wherein the distillate depending upon its composition may or may not separate into two liquid phases, a lower aqueous phase and an upper organic phase. For example when handling ethanol-isopropanol mixtures the overhead distillate in most cases will be one phase. When handling a n-propanol or n-butanol cut containing other close boiling oxygenated compounds the overhead from the first fractionation zone will usually separate into two phases.

A controlled portion of the total distillate or of the lower aqueous phase layer in the event of phase separation in receiver 9 is passed by line 11 as external reflux to the upper part of column 1. Any excess portion of the separated aqueous phase may be withdrawn from the system by line 12.

In those cases where phase separation is not contemplated or desired the overhead from column 1 may be conducted directly to column 14 as a vaporous feed without condensation in condenser 8. This is especially feasible in those fractionations in which it has been found (not the subject of this invention) that the separation is more complete in the absence of liquid external reflux to column 1.

The bulk of the condensed distillate or of the upper organic phase layer in the event of phase separation is withdrawn from the receiver 9 by line 13 to be transferred to the second fractionating column 14 for fractional distillation in the presence of a high concentration of a non-polar internal refluxing medium such as a hydrocarbon oil as will be later described.

The residual portion of the high water content internal refluxing medium which flows through the stripping section 4 to the bottom of column 1 is a dilute aqueous solution of at least one of the alcohols to be isolated from the initial feed. A portion of this aqueous bottoms from column 1 is heated, partly vaporized and recycled by lines 15 and 16 through a heat exchanger 56, which may supply heat directly or indirectly by a heating medium such as live steam.

Another portion of the aqueous bottoms in column 1 withdrawn by line 15 is passed by line 16 into an alcohol concentrating column 17, which is equipped in a conventional manner as a fractional distillation column with liquid-vapor contacting means for obtaining rectification of the dilute aqueous alcohol. The concentrated alcohol vapors may be withdrawn overhead from column 17 by line 18 through a condenser 19 to a receiver 20. A portion of the distillate from receiver 20 may be returned to the top of column 17 as external reflux by line 21. Water bottoms are withdrawn from the base of column 17 by line 22. A portion of these water bottoms may be recycled by lines 23 and 24 to the base of column 17 for reboiling in passing through the reboiler 25. Another portion of the water bottoms from column 17 is passed by line 26 through a heat exchanger 27 for temperature control and then is passed through the feed inlet line 5 to the upper part of column 1 for supplying water required in the internal reflux medium that flows down through column 1. Any excess of the water bottoms from column 17 are withdrawn from the system through line 28.

In the event that the dilute aqueous alcohol bottoms from column 1 contains more than one alcohol component, column 17 may be provided with a side stripper 29 which receives a side stream from one of the rectifying plates in column 17 by line 30, returns stripped vapors back to column 17 by line 31 and discharges a concentrated alcohol product through line 32. This procedure may be followed for example in the concentration of aqueous ethanol which contains some normal propanol.

The second main fractionating column 14 is equipped like the first main column 1 with a primary rectifying section 34, a secondary rectifying zone 59, and a stripping section 35. The condensate from receiver 9 enters column 14 at a point between the rectifying and stripping sections. The solvent feed inlet 36 supplies the solvent which is to constitute the major proportion of the internal liquid refluxing medium which flows down through column 14. Vapors from the feed material entering column 14 by line 13 pass upwardly countercurrent to the internal reflux medium and the resulting rectified vapors comprising the second desired product plus water are withdrawn overhead from column 14 by line 37 which leads the vapors through a cooling condenser 38 to a receiver 39. A portion of the distillate is returned from receiver 39 by line 57 as external reflux to the upper part of column 14 while another portion of the distillate is withdrawn by line 41 from 39 as another concentrated product.

The presence of secondary rectification zone 59 in column 14 is important in that it is essential that the overhead distillate collected in receiver 39 be free of non-polar solvent. This eliminates the need for an additional solvent recovery step.

The residual internal refluxing medium which descends through the stripping section 35 in column 14 is withdrawn as bottoms by line 40 in a substantially anhydrous condition. A portion of this solvent bottoms is reheated and vaporized in heat exchanger 42 for return to base of column 14 by line 43. The heating in the heat exchanger 42 may be accomplished by indirect heat exchange with live steam or by other conventional high temperature heat sources. A remaining portion of the solvent bottoms withdrawn from column 14 by line 40 is passed through line 44 to a stripping column 45 which is utilized for stripping volatile neutral oxygenated compounds from the solvent medium. Column 45 may be a conventional fractionating column with the usual liquid-vapor phase contacting means. The volatilized neutral oxygenated compounds are distilled overhead from column 45 through line 46 and are passed through cooling condenser 47 to a receiver 48. A portion of the distillate is returned by line 49 as external reflux to the upper part of column 45 from receiver 48 and a remaining portion of this distillate is withdrawn as a product by line 50.

Stripped solvent bottoms are withdrawn from the base of the stripping column 45 by line 58 partly to be recycled by lines 51 and 52 through a reboiler 53. A remaining portion of the solvent bottoms from stripping column 45 is passed by line 54 through a heat exchange temperature controller 55 for return through line 36 to the upper part of column 14 in order to supply the high solvent concentration required in the internal liquid refluxing medium that flows down through column 14. Any desired portion of the solvent bottoms from column 14 may be withdrawn from the system for separate processing to recover oxygenated compounds, for example, processing by solvent extraction or by treatment with an adsorbent, if desired, but these additional processing treatments are not intended to be parts of this invention. Other accessories are conventional types of equipment which may be employed, even though omitted from the drawing for the sake of simplicity.

The non-polar solvent employed as internal reflux in the second fractional distillation zone may be a hydrocarbon which remains liquid under conditions existing in the fractionation zone. Suitable hydrocarbon liquids for use in the process include refined white oils, pure paraffins, olefins, naphthenes, aromatics and mixtures thereof. Fractions from virgin or cracked hydrocarbon stocks may be used. The initial boiling point of the hydrocarbon should preferably not be appreciably lower than that of the highest boiling oxygenated component to be separated. The final boiling point of the hydrocarbon is not material except that the hydrocarbon must be liquid under the conditions existing in the fractionation zone. It is preferred to use a hydrocarbon whose initial boiling point is sufficiently high so that it will not azeotrope with any of the alcohols or non-alcoholic oxygenated compounds present during the separations. In this regard the hydrocarbon should have an initial boiling point which is about 100° C. but at least 70° C. higher than the highest boiling oxygenated component present in the mixture being distilled. Hydrocarbons boiling in the range of about 175° F. to 900° F. or any fractions thereof such as a white oil fraction boiling in the range of 396° F. to 522° F. are preferred solvents. Gasoline fractions including gasoline fractions recovered from the product of the catalytic hydrogenation of carbon monoxide may also be employed. Some of the gasoline fractions may contain light ends which boil below about 175° F. are perfectly operable as solvents but are not preferred due to the possibility of azeotrope formation between the lower boiling hydrocarbons in the fraction with the oxygenated compounds present. If the light ends are present only in small amounts their presence can be tolerated.

A basic advantage of the process described is that it enables one to obtain the desired alcohols (bottoms from the first water extractive distillation zone, and overhead from the second non-polar solvent extractive distillation zone) without having to isolate any of the other oxygenated impurities. In addition the other impurities are obtained in anhydrous form so that they may be processed for or incorporated directly into gasoline as blending agents.

This unitary process is particularly suited to the workup of mixtures of oxygenated compounds including two or more alcohols obtained from the catalytic hydrogenation of carbon monoxide, when the second alcohol comprises less than 25% of the material processed in the second extractive distillation tower.

Basic data have been obtained in the application of the process as described in Example I below for the recovery of purified ethanol and purified isopropanol as two main separate products in the treatment of aqueous crude mixtures of these alcohols contained in a mixture with other oxygenated components listed in Example I. These data clearly demonstrate that with sufficiently large concentrations of water in the internal reflux flowing down through a fractional distillation zone, the isopropyl alcohol and any attendant non-alcoholic neutral oxygenated compounds are rendered much more volatile than the ethyl alcohol so that the ethyl alcohol remains isolated in the aqueous reflux. These data also indicate that a large proportion of water vapor tends to be present with the vaporized isopropanol that leaves the upper part of a rectifying section in which the ethanol vaporization is sufficiently depressed to effect the separation of the ethanol from the isopropanol. With the vaporized isopropanol leaving the upper part of the rectifying section there are present other neutral organic compounds which contaminated the ethyl alcohols in the initial feed since these contaminants are even more readily volatilized than the isopropanol.

Similar application of the process can be made to effect the separation of n-propanol from a mixture containing higher alcohols among other constituents as described in Example II below.

EXAMPLE I

An aqueous mixture containing ethanol, isopropanol and non-alcoholic neutral oxygenated compounds such as acetone, methyl ethyl ketone, n-butyraldehyde, n-valeraldehyde, ethyl acetate and n-propyl acetate was fed to a first extractive distillation column where the mixture was distilled and the vapors rose through the column countercurrent to an internal liquid aqueous reflux containing approximately 90 mol percent water. The non-alcoholic neutral oxygenated components present boil in the wet state up to 82.4° C. Ethyl alcohol dissolved in water was removed as bottoms from the first column, while isopropanol and the oxygenated compounds distilled overhead together with some of the water. The overhead was condensed and led to a second extractive distillation column wherein the vapors were distilled countercurrent to an internal liquid reflux containing approximately 90 volume percent of a highly refined paraffinic oil boiling in the range of 396°–522° F. Aqueous isopropanol was recovered as overhead from the second column, while the neutral non-alcoholic oxygenated compounds were removed from the bottom of the column in substantially anhydrous condition dissolved in the oil solvent.

EXAMPLE II

The process as set forth in Example I was repeated with a synthetic aqueous feed stock containing n-propanol, n-butanol, secondary and iso-butanol, pentanol-2, methyl propyl ketone, methyl isobutyl ketone, isovaleraldehyde, and n- butyl acetate. An aqueous reflux containing approximately 95 mol per cent water was employed. The non-alcoholic neutral oxygenated compounds present boiled in the wet state at temperatures up to 90.2° C. Normal propanol dissolved in water was recovered as bottoms from the first column, while the remaining alcohols and non-alcohol neutral oxygenated components distilled overhead substantially free of n-propanol. When the overhead from the first column was extractively distilled employing the same concentration of the same oil solvent as used in Example I the remaining alcohols, viz., the butanols and pentanol-2 together with the water were recovered as vapors in the overhead, while the ketones, iso-valeraldehyde and n-butyl acetate in substantially anhydrous condition were removed as bottoms.

EXAMPLE III

A hydrocarbon synthesis product containing aqueous $C_2$-$C_5$ alcohols together with non-alcoholic neutral oxygenated compounds such as aldehydes, ketones and esters boiling in the same range was distilled in an extractive distillation column employing water in concentrations of approximately 90 mol percent in the internal liquid reflux. The feed contained approximately 79 weight percent alcohols; 0.1 weight percent $C_3$ aldehydes; 0.6 weight percent $C_3$ ketones; 0.3 weight percent $C_3$ esters; 0.9 weight percent acetals; 0.2 weight percent $C_2$ acids; and the balance water. Substantially all the ethanol was removed from the mixture as an aqueous solution as bottoms from the column. The small amount of acids present were recovered in the bottoms with the ethanol. The overhead was condensed and fed to a second extractive distillation column employing an internal liquid reflux containing approximately 90 vol. percent of a gasoline obtained from the catalytic hydrogenation of carbon monoxide. The gasoline had an initial boiling point of 131° F. and a final boiling point of 419° F. The bulk of the gasoline boiled between 187° F. and 390° F. The overhead from the first column was fed to the second column at a rate of 64 cc./hr., while the gasoline solvent was fed at the rate of 600 cc./hr. The distillate separated into two phases. Of the hydrocarbon phase 78 cc./hr. was refluxed to the column through the solvent preheater while the balance of 26 cc./hr. was withdrawn from the system. The hydrocarbon phase contained approximately 4.3 volume percent of alcohols chiefly $C_3$-$C_5$ alcohols. The lower aqueous phase was withdrawn at a rate of 22 cc./hr. It contained 75 volume percent alcohols chiefly $C_3$-$C_5$ alcohols. A total of 34 volume percent of the alcohols in the feed were taken overhead. The balance of the alcohols were recovered with the neutral non-alcoholic oxygenated compounds as a solution in the gasoline as bottoms from the column. A much cleaner split could have been made by taking more overhead from the column.

The volatilities of eighteen different oxygenated compounds relative to ethanol as a function of water concentration are presented in Table I. The data contained therein will enable one to chose the proper water concentration required for any given separation indicated.

The relative volatilities of seven different systems in a non-polar solvent, specifically a highly refined paraffinic white oil are set forth in Table II. The data show that in the presence of the white oil solvent at the concentration given the alcohols are more volatile than the non-alcoholic neutral compounds, and the alphas are sufficiently high to effect the separation.

TABLE I

*Volatilities relative to ethanol as a function of water concentration*

| Oxygenated Compound | Mol Percent Water | | | | | | | |
|---|---|---|---|---|---|---|---|---|
| | 95 | 91 | 90 | 88 | 85 | 80 | 75 | 65 |
| Methanol | 0.63 | 0.69 | 0.70 | 0.73 | 0.77 | 0.83 | 0.90 | 1.01 |
| Ethanol | 1.0 | 1.0 | 1.0 | 1.0 | 1.0 | 1.0 | 1.0 | 1.0 |
| n-Propanol | 1.30 | | 1.07 | 1.01 | 0.95 | 0.87 | 0.80 | 0.70 |
| n-Butanol | 1.69 | | 1.20 | 1.02 | 0.82 | 0.60 | 0.48 | 0.38 |
| n-Pentanol | 1.68 | 0.90 | | | | | | 0.33 |
| iso-Propanol | 1.61 | | 1.50 | 1.47 | 1.42 | 1.36 | 1.30 | 1.21 |
| iso-Butanol | 2.43 | | 1.64 | 1.47 | 1.27 | 1.06 | 0.92 | 0.75 |
| sec-Butanol | 2.01 | | 1.68 | 1.555 | 1.385 | 1.14 | 0.98 | 0.88 |
| Pentanol-2 | 2.77 | | 1.77 | 1.49 | 1.18 | 0.85 | 0.67 | 0.58 |
| Propionaldehyde | 16.7 | | 14.6 | 14.0 | 13.1 | 11.8 | 10.6 | 8.8 |
| n-Valeraldehyde | | | 7.75 | 7.25 | 6.55 | 5.0 | 4.05 | 2.55 |
| Acetone | 2.95 | | 3.0 | 3.02 | 3.03 | 3.05 | 3.03 | 3.0 |
| Methyl iso-Butyl Ketone | | | 5.95 | 4.88 | 4.08 | 3.00 | 2.38 | 1.78 |
| Methyl Ethyl Ketone | | | 3.50 | | | | | |
| i-Valeraldehyde | 4.52 | | | | | | | |
| Methyl propyl Ketone | 5.03–6.89 | | | | | | | |
| Ethyl Acetate | | | | | | | 12.9 | |
| n-Propyl Acetate | | | | | | | >12.9 | |

TABLE II

*Relative volatilities in non-polar solvents*

| System | Solvent | Alpha A : B |
|---|---|---|
| n-butanol : methyl isobutyl ketone. | 90 weight percent white oil.[1] | 1.33–2.12 |
| n-butanol : n-butyl acetate | do | 2.04–2.08 |
| n-butanol : s-butyl acetate | do | 1.67 |
| n-butanol : n-valeraldehyde | do | 1.25–1.89 |
| isopropanol : methyl ethyl ketone. | do | 1.33–1.54 |
| n-propanol : methyl propyl ketone. | do | 1.77 |
| sec-butanol : methyl propyl ketone. | do | 1.40–2.07 |

[1] Highly refined paraffinic fraction B. P. 396–522° F., sp. gr. 0.800, aniline pt. 176° F., flash 160° F., viscosity at 100° F.-30 SSU.

What is claimed is:

1. The method of separating and recovering n-propanol n-butanol and close-boiling non-alcoholic saturated unsubstituted neutral oxygenated compounds from mixtures thereof which comprises, introducing the mixture into a first fractionation zone wherein vapors of the alcohols and oxygenated compounds ascend counter-currently to a liquid reflux of said vapors dissolved in 95 to 99 mol percent of water to effect a higher vaporization of the n-butanol and of the oxygenated compounds than of n-propanol, removing a solution of n-propanol in water from a bottom portion of the first fractionation zone, withdrawing n-butanol, the oxygenated compounds and water as overhead from the first fractionation zone, introducing the n-butanol, oxygenated compounds and water into a second fractionation zone wherein vapors of the n-butanol, oxygenated compounds and water ascend countercurrently to a liquid reflux of said vapors dissolved in 70 to 99 volume percent of a liquid hydrocarbon solvent which does not azeotropically distill to any appreciable extent from the second fractionation zone to effect a higher vaporization of the n-butanol and water than of the oxygenated compounds, recovering n-butanol and water as overhead from the second fractionation zone, and recovering a solution of the oxygenated compounds and hydrocarbon solvent in substantially anhydrous condition from a bottom portion of the second fractionation zone.

2. The method according to claim 1 in which the oxygenated compound present boil in the wet state at temperatures up to 90.2° C.

3. The method according to claim 1 in which the mixture also contains other $C_4$ and $C_5$ aliphatic alcohols which are recovered overhead from the second fractionation zone together with the n-butanol, and in which the hydrocarbon solvent is a highly refined paraffinic oil boiling in the range of 396° F. to 522° F.

CARL S. CARLSON.
PAUL V. SMITH, JR.

References Cited in the file of this patent

UNITED STATES PATENTS

| Number | Name | Date |
|---|---|---|
| 887,793 | Guillaume | May 19, 1908 |
| 996,328 | Guillaume | June 27, 1911 |
| 1,929,901 | Ricard et al. | Oct. 10, 1933 |
| 2,107,265 | Archibald | Feb. 8, 1938 |
| 2,148,846 | Von Retze et al. | Feb. 28, 1939 |
| 2,198,651 | Bludworth | Apr. 30, 1940 |
| 2,290,442 | Metzl | July 21, 1942 |
| 2,290,636 | Deanesly | July 21, 1942 |
| 2,351,527 | Lembecke | June 13, 1944 |
| 2,386,058 | Patterson et al. | Oct. 2, 1945 |
| 2,434,424 | Morris et al. | Jan. 13, 1948 |
| 2,476,205 | McCants | July 12, 1949 |
| 2,476,206 | McCants | July 12, 1949 |
| 2,477,087 | Robertson | July 26, 1949 |
| 2,483,246 | Stribley | Sept. 27, 1949 |
| 2,500,596 | Adelson | Mar. 14, 1950 |
| 2,551,593 | Gilliland et al. | May 8, 1951 |
| 2,591,712 | Morrell et al. | Apr. 8, 1952 |
| 2,591,713 | Morrell et al. | Apr. 8, 1952 |